G. L. HERZ.
COMBINED SPARK INDICATOR AND INTENSIFIER.
APPLICATION FILED DEC. 21, 1915.

1,317,924.

Patented Oct. 7, 1919.

Witness:—
Hyperion Barry.

Inventor.
Gustave L. Herz
by attorney

UNITED STATES PATENT OFFICE.

GUSTAVE L. HERZ, OF NEW YORK, N. Y.

COMBINED SPARK INDICATOR AND INTENSIFIER.

1,317,924.   Specification of Letters Patent.   Patented Oct. 7, 1919.

Application filed December 21, 1915. Serial No. 68,080.

*To all whom it may concern:*

Be it known that I, GUSTAVE L. HERZ, a citizen of the United States, and resident of the borough of Manhattan, in the city and State of New York, have invented a new and useful Improvement in Combined Spark Indicators and Intensifiers, of which the following is a specification.

In multi-cylinder gas engines of the internal combustion type, the best results are obtained when the sparks of the spark plugs are as intense as possible and when all of the spark plugs are kept in good sparking condition.

The greater the number of cylinders the more important these features become.

The object of my invention is to provide a spark indicator and intensifier consisting of an instrument which may be placed in the electric circuit at a convenient point such as at the instrument or dashboard where the failure of any of the spark plugs of the engine to properly spark will be immediately indicated at the spark gap for that particular plug.

A further object is to provide an instrument of the above character in which the electrodes of the spark gaps are arranged in recesses so that the darkness of the recess even when the instrument is in a very bright light will effectively display the spark at the spark gap if its plug is sparking properly.

Figure 1:
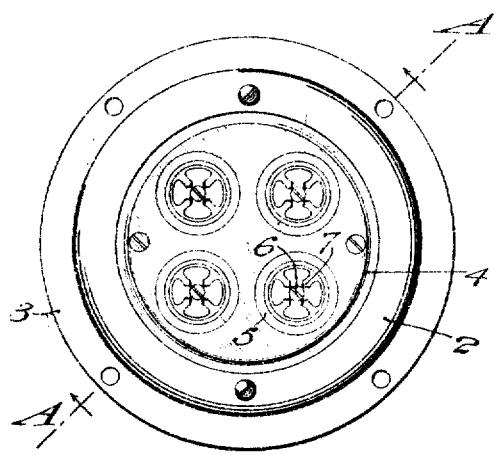
Figure 2:
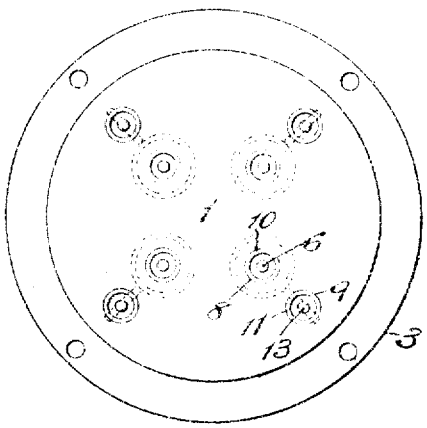
Figure 3:
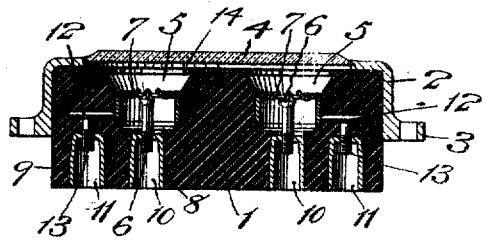

A practical embodiment of my invention is represented in the accompanying drawings, in which Figure 1 represents the instrument in front elevation, Fig. 2 represents the instrument in back elevation, and Fig. 3 represents the instrument in section taken in the plane of the line A—A of Fig. 1.

The insulating block 1 of the instrument is provided with a housing 2 having a suitable flange 3 for securing the instrument to its support. This housing 2 is provided with a single transparent window 4 through which all of the spark gaps with which the instrument is provided may be observed.

This insulating block 1 carries the electrodes of a plurality of spark gaps one for each cylinder spark plug. In the present instance, the instrument is shown as designed for use in connection with four spark plugs but it is to be understood that the instrument may be designed for any number desired.

The front of the insulating block 1 has a plurality of spark gap recesses 5, within which recesses are located the electrodes 6, 7, of the spark gaps. The back of this insulating block 1 has a plurality of pairs of recesses 8, 9, in which are located the pairs of cups 10, 11, for receiving the terminals of the spark plug wires, not shown, which terminals may be of any well known or approved form.

Each electrode 6 comprises a rod which is screw threaded into its metal cup 10, the head of which electrode is surrounded by the sparking points of the other electrode 7, which other electrode comprises a ring electrically connected to the cup 11 through the rods 12, 13, the rod 13 having a screw threaded engagement with the said cup.

The mouths of the spark gap recesses 5 may be made flush, as shown, and a plate 14 may be interposed between the front of the insulating block 1 and the window 4, which plate will have openings therethrough in alinement with the spark gap recesses in the block so that all of the spark gaps will be seen through the common window 4.

From the above description it will be seen that not only will the sparks at the spark plugs be intensified by the provision of the spark gaps, thus preventing, to a great degree, the fouling of the electrodes of the spark plugs, but also the instrument may be placed at a convenient point where the proper operation of all of the spark plugs can be observed, the instrument at the same time being simple and compact and readily inserted into the spark plug circuit.

It is evident that the particular construction of the electrodes of the spark gaps may be changed as desired, one embodiment only being shown herein.

It will also be seen that the spark gaps may be adjusted by the adjustment of the electrodes 6, the sparking end of the said electrodes being provided with kerfs, if so desired, for facilitating the adjustment of the said electrodes with respect to the sparking points of the electrodes 7.

Suitable means may be employed for removably securing the housing 2 and the plate 14 to the insulating block if so desired.

It is evident that slight changes may be resorted to in the form, construction and arrangement of the several parts without departing from the spirit and scope of my invention; hence I do not wish to limit myself strictly to the structure herein set forth, but

What I claim is:—

1. A spark indicator and intensifier consisting of an instrument comprising an insulating block having a plurality of front recesses therein, the electrodes of a spark gap located in each recess and arranged for connection with their spark plug terminals through the back of the block, a housing for the block and a common window carried by said housing, covering said front recesses.

2. A spark indicator and intensifier consisting of an instrument comprising an insulating block having a plurality of recesses in its front and a plurality of pairs of recesses in its back, the electrodes of a spark gap being located in each front recess and metal cups in each pair of back recesses for connecting the spark gap electrodes to their respective spark plug wires.

3. A spark indicator and intensifier consisting of an instrument comprising an insulating block having a plurality of recesses in its front and a plurality of pairs of recesses in its back, the electrodes of a spark gap being located in each front recess and metal cups in each pair of back recesses for connecting the spark gap electrodes to their respective spark plug wires, and a housing for the block having a common window covering the spark gap recesses, through which window the spark gaps may be seen.

In testimony, that I claim the foregoing as my invention, I have signed my name this eighth day of December 1915.

GUSTAVE L. HERZ.